United States Patent [19]

Soubaras

[11] Patent Number: 5,757,720
[45] Date of Patent: May 26, 1998

[54] PROCESSING METHOD FOR CALIBRATING A HYDROPHONE-GEOPHONE SENSOR PAIR, AND A SEISMIC PROSPECTING METHOD IMPLEMENTING THE PROCESSING

[75] Inventor: Robert Soubaras, Orsay, France

[73] Assignee: Compagnie General de Geophysique, Massy, France

[21] Appl. No.: 787,815

[22] Filed: Jan. 22, 1997

[51] Int. Cl.$^6$ ............................................. G01V 1/28
[52] U.S. Cl. ............................................. 367/13; 367/24
[58] Field of Search .................................. 367/13, 24, 21, 367/15; 181/110

[56] References Cited

U.S. PATENT DOCUMENTS

| | | | |
|---|---|---|---|
| 4,486,865 | 12/1984 | Ruehle | 367/24 |
| 4,887,244 | 12/1989 | Willis et al. | 367/73 |
| 4,979,150 | 12/1990 | Barr | 367/24 |
| 5,163,028 | 11/1992 | Barr et al. | 367/13 |
| 5,235,554 | 8/1993 | Barr et al. | 367/13 |
| 5,365,492 | 11/1994 | Dragoset, Jr. | 367/24 |
| 5,396,472 | 3/1995 | Paffenholz | 367/24 |
| 5,524,100 | 6/1996 | Paffenholz | 367/24 |
| 5,621,699 | 4/1997 | Rigsby et al. | 367/24 |
| 5,621,700 | 4/1997 | Moldoveanu | 367/24 |

FOREIGN PATENT DOCUMENTS

0534648A1  3/1993  European Pat. Off. .

OTHER PUBLICATIONS

"Ocean-Bottom cable dual-sensor scaling", Bill Dragoset and Fred J. Barr, Western Geophysical, SA 1.2, pp. 857–860, SEG 1994.

"A Dual-Sensor Bottom-Cable 3-D Survey in the Gulf of Mexico", F.J. Barr, et al. SA 1.2, pp. 855–858, SEG 1990.

"Attenuation of Water-Column Reverberations Using Pressure and Velocity Detectors in a Water-Bottom Cable", Fred J. Barr and Joe I. Sanders, Halliburton Geophysical Services, Inc., SA 2.6, pp. 653–656, SEG 1989.

*Primary Examiner*—Daniel T. Pihulic
*Attorney, Agent, or Firm*—Haynes and Boone, L.L.P.; Rita Irani

[57] ABSTRACT

A processing method for calibrating at least one pair of hydrophone-geophone sensors disposed on a water bottom and used in seismic prospecting processing in which a sound source emits a signal into the water and the sensors at the water bottom pick up hydrophone and geophone recordings H and G, wherein calibration is applied to the recordings to minimize, in a time window beyond a theoretical extinction time, the energy of a signal S which is determined as a function of the hydrophone and geophone recordings and which corresponds to the source signal propagated through the layer of water to the sensor.

18 Claims, 2 Drawing Sheets

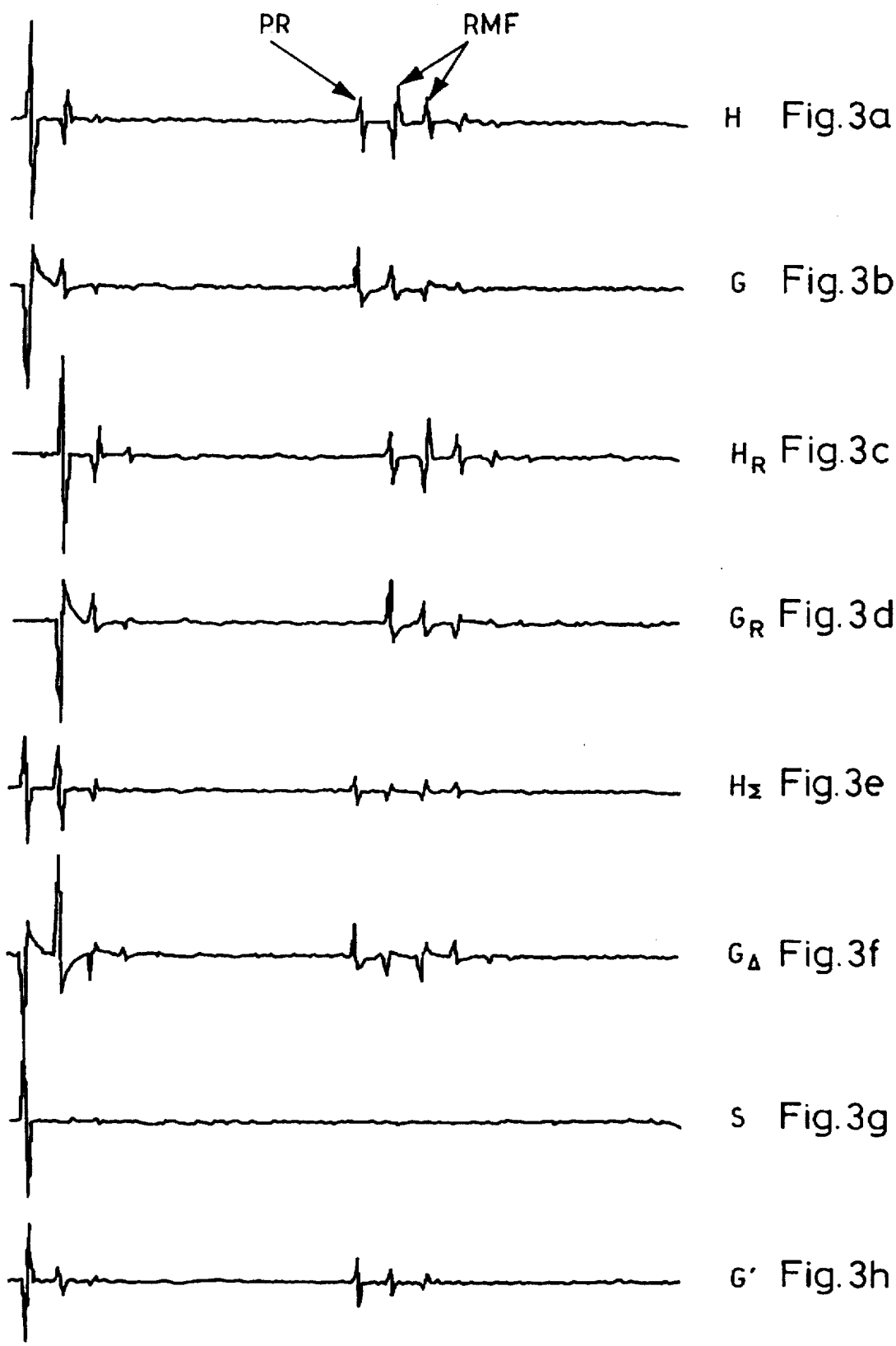

PROCESSING METHOD FOR CALIBRATING A HYDROPHONE-GEOPHONE SENSOR PAIR, AND A SEISMIC PROSPECTING METHOD IMPLEMENTING THE PROCESSING

FIELD OF THE INVENTION

The present invention relates to a processing method for calibrating at least one hydrophone-geophone sensor pair used in offshore seismic prospecting processing.

The invention also relates to an offshore seismic prospecting method that implements such processing.

BACKGROUND OF THE INVENTION

For offshore seismic prospecting, use is generally made of cables carrying hydrophone sensors and towed by ships that also carry sound sources.

Such cables, generally referred to as "streamers" by the person skilled in the art, cannot be used in certain zones, and in particular in production zones which are cluttered with platforms.

Under such circumstances, the soundwaves emitted by the ships are received by hydrophones placed on the sea bottom.

In these various techniques, the recordings made by the hydrophones must be processed so as to eliminate "ghosts" from the signals obtained (where "ghosts" are primary waves carrying information about sub-surface geology and reflected at the surface of the water), and also possibly to eliminate reverberations, known as "peg-legs", which correspond to multiple reflections at the surface and at the water bottom, making recordings difficult to interpret.

Spectrally, ghost waves are equivalent to useful data being filtered via a notch filter which removes frequencies from the signal that are multiples of $f_n = v/(2\Delta z)$, where $\Delta z$ is the depth of the receivers and $v$ is the speed of sound in water (1500 meters per second (m/s)).

When $\Delta z$ is less than 10 m, as is the case for conventional acquisition using hydrophones carried by a cable towed by a ship, $f_n$ is greater than 75 Hz and said notch frequencies lie outside the usable passband. Under such circumstances, the ghost wave appears in the usable passband only as attenuation, and can be eliminated by deconvolution.

However, when hydrophone sensors are placed on the water bottom, $\Delta z$ is the depth of the water, which is typically 50 m, so $f_n = 15$ Hz. The passband is punctuated by frequencies at which the response signal is hidden by the ghost wave. Eliminating the ghost wave by deconvolution leads to a large amount of noise being added to the results.

Recently, several techniques have been proposed in which acquisition is performed by means of hydrophone and geophone sensors disposed on the sea bottom.

In particular, U.S. Pat. No. 4,486,865 discloses a seismic acquisition method using hydrophones and geophones distributed in pairs at the water bottom, and in which the hydrophone component and the geophone component of a given pair of sensors are deconvoluted by their previously-determined spectral functions, and the deconvoluted data is averaged to obtain an output which corresponds to the up wave immediately above the bottom of the water surface, and from which the ghost waves have been eliminated.

However, the hydrophone and geophone recordings have to be calibrated before being jointly usable. A perfect hydrophone measures the pressure and a perfect geophone measures the velocity. A real hydrophone measures the pressure as filtered by an instrumental response and a real geophone measures the velocity as filtered an instrumental response. By definition, a calibration operation equalizes the instrumental responses.

It has been proposed by U.S. Pat. No. 4,979,150 a seismic method which uses a processing which combines the hydrophone and geophone recordings and seeks to eliminate ghost waves and "peg-leg" type reverberations without requiring deconvolution to be applied to the hydrophone and geophone recordings.

With this processing, a calibration scalar is applied to the hydrophone component or to the geophone component and components calibrated in this way are summed. The calibration scalar is a function, in particular, of the reflection coefficient of the water bottom. It is implemented in a deterministic manner, on the basis of calibration shots or in a statistic manner, with the assumption that the subsoil reflectivity presents a white autocorrelation.

A similar method has also been proposed in U.S. Pat. No. 5,365,492. According to this method, a calibration scalar is applied to a geophone recording in which the noise is previously cleared away. The geophone recording first cleared and calibrated is summed to that of the hydrophone, which gives the desired output without the reverberation in the water layer.

The calibration scalar is calculated by a repeated maximizing of a varimax function of the autocorrelation of the output signal.

However, the calibration scalar as proposed in U.S. Pat. No. 5,365,492 also supposes the assumption that the reflectivity of the geology presents a white autocorrelation.

However, this assumption, which is currently used in technic processing, is not always true.

Further, a calibration scalar is necessarily imprecise since it does not take into account the spectral variation of the coupling.

Further, the determination of the calibration scalar by an iterative processing implies that such scalar is much sensitive to noise and that therefore a step of noise clearing is necessary.

OBJECTS AND SUMMARY OF THE INVENTION

The aims of the invention are to overcome these various drawbacks and the invention proposes a calibration processing which equalizes the instrumental responses of the hydrophone and geophone with a spectral calibration calculated with a criterium which is sturdy to noise and which is suitable for the case where both the hydrophone and geophone are noised, said criterium making no statistic assumption on the reflectivity of the sub-soil and implying no calibration shots.

More particularly, the invention provides a processing method for calibrating at least one pair of hydrophone-geophone sensors disposed on a water bottom and used in seismic prospecting processing in which a sound source emits a signal into the water and the sensors at the water bottom pick up hydrophone and geophone recordings H and G, wherein calibration is applied to the recordings to minimize, in a time window beyond a theoretical extinction time, the energy of a signal S which is determined as a function of the hydrophone and geophone recordings and which corresponds to the source signal propagated through the layer of water to the sensor.

Thus, the processing proposed by the invention performs calibration on the assumption that the duration of emission from the seismic source is limited. This assumption is much more reliable than that of reflectivity being white as is implied in prior art statistical calibration methods.

Calibration determined using the method proposed by the invention can vary slowly with frequency in order to correct imperfections of coupling between the geophone and the water bottom.

In a preferred implementation, the hydrophone recordings H are filtered by an operator that adds a geophone type ghost reflection thereto, and then the geophone recordings G are filtered by an operator that adds a hydrophone type reflection thereto, and a calibration is sought to provide, in a time window beyond the theoretical extinction time, best equalization of the hydrophone recordings and of the geophone recordings as filtered in this way.

Also advantageously, the geophone recordings are calibrated against the hydrophone recordings.

In particular:

hydrophone data $H_R$ and geophone data $G_R$ is determined corresponding to the recordings H and G propagated over a go-and-return path through the layer of water;

hydrophone sum data $H_\Sigma$ and geophone difference data $G_\Delta$ are calculated as follows:

$$H_\Sigma = \frac{H + rH_R}{2}$$

and $$G_\Delta = \frac{G - rG_R}{2}$$

where r is a transfer function modelising the surface of the water, calibration functions $C_H$ and $C_G$ are determined to minimize, beyond a theoretical extinction time, the energy of S:

$$S = C_H * H_\Sigma - C_G * G_\Delta$$

where S corresponds to the source signal propagated through the layer of water; and the hydrophone geophone data are calibrated by convolution with the calibration functions $C_H$ and $C_G$.

As will be understood on reading the following description, these calibration functions $C_H$ and $C_G$ do not depend on the reflectivity of the water bottom.

The invention also provides an offshore seismic prospecting method in which the above processing method is implemented and the data obtained in this way is processed to deduce information therefrom about the subsoil geology.

BRIEF DESCRIPTION OF THE DRAWINGS

Other characteristics and advantages of the invention appear further from the following description. The description is purely illustrative and non-limiting. It should be read with reference to the accompanying drawings, in which:

FIGS. 3a to 3h show the various signals obtained in the various steps of the method of the invention in response to a synthetic source signal.

MORE DETAILED DESCRIPTION

Figure 1:
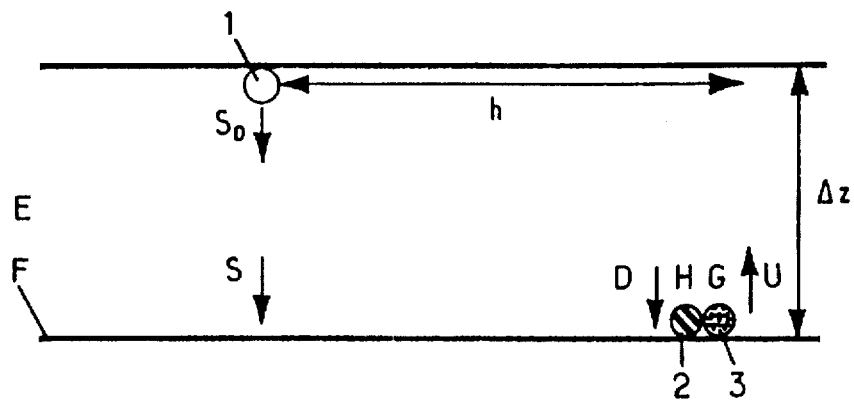
FIG. 1 is a diagram showing the various quantities involved in the model used for the method of the invention.
Figure 2:
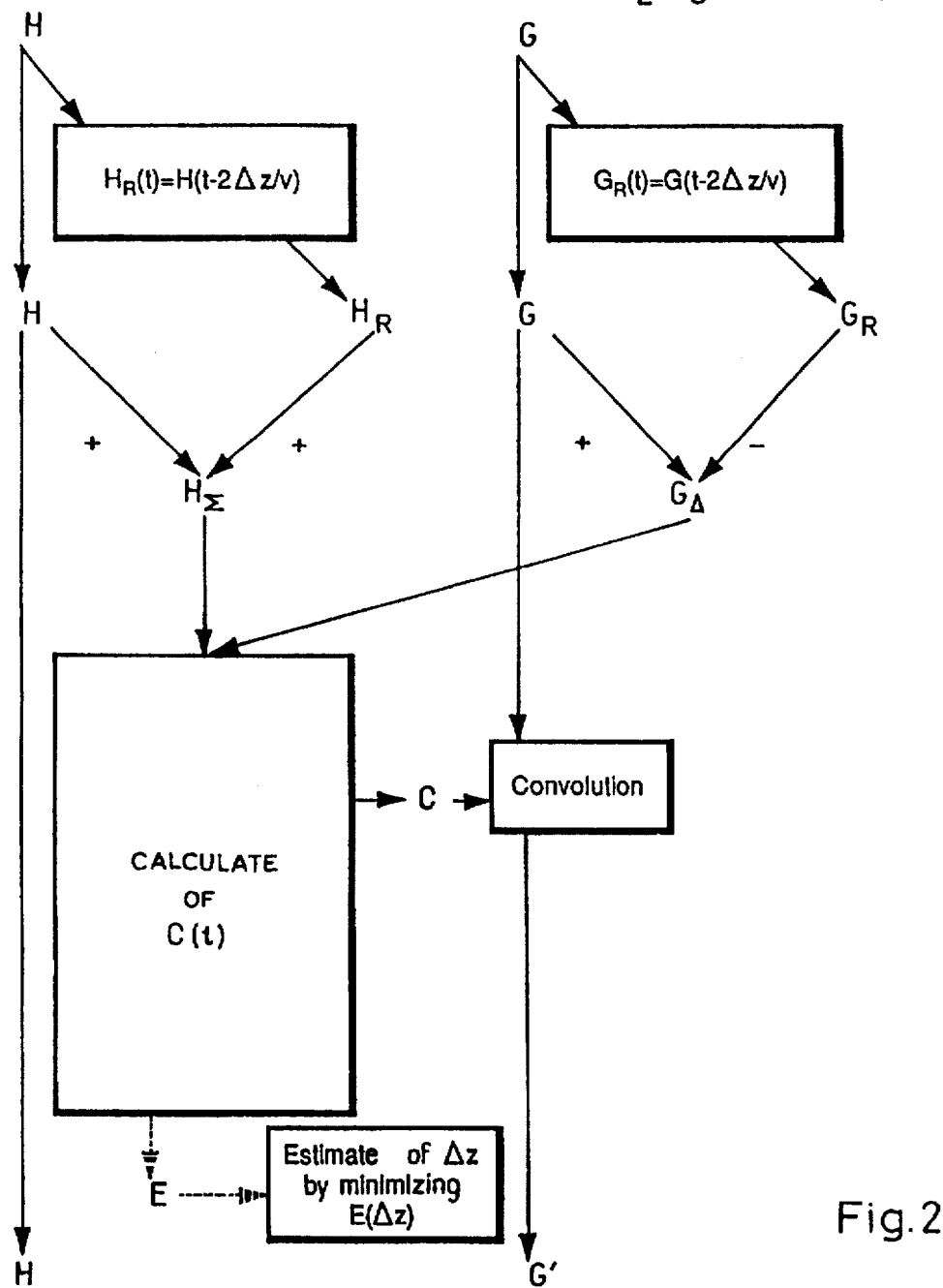
FIG. 2 is a summary chart showing the method of the invention.

FIG. 1 shows a sound source 1 emitting a signal $S_0$ at the surface of a layer of water E, together with hydrophone sensors 2 and geophone sensors 3 disposed on the sea bottom F. The layer of water E has thickness $\Delta z$. The horizontal distance between the source 1 and the hydrophone-geophone sensor pair 2, 3 is referenced $\underline{h}$.

The hydrophone sensors 2 measure pressure and are isotropic. They record the sum of up soundwaves U and down soundwaves D.

The geophone sensors 3 are placed vertically on the bottom F and they measure the vertical speed of soundwaves. They record the up soundwaves U, subtracting therefrom the down soundwaves D.

The signals H and G recorded by the hydrophones 2 and the geophones 3 can be written as functions of the up waves U and the down waves D, as follows:

$$H = U + D \quad (1)$$

$$G = (U - D)/I_0 \quad (2)$$

In equation (2), $I_0$ is the acoustic impedance of the water ($I_0 = \rho v$, where $\rho$ is the density of the water, and $\underline{v}$ is the speed of sound in the water).

To simplify the description below, it is assumed that $I_0 = 1$, since in any event the geophone is to be calibrated.

The surface of the water behaves like a reflector having a reflection coefficient of $-1$ and it adds a down wave to the signal corresponding to the source $S_0$, which down wave is equal to the up wave U, but of opposite sign.

Consequently, at the water bottom, the down wave is written as follows:

$$D = -ZU + Z^{1/2}S0 \quad (3)$$

where Z is an operator corresponding to go-and-return propagation through the layer of water, i.e. to a time delay $\Delta t = 2\Delta z/v$ where $\underline{v}$ is the speed of sound in the layer of water, and where $Z^{1/2}\_$ is an operator corresponding to go propagation of sound between the surface and the water bottom.

For a 1-D approximation, Z is merely a time delay $\Delta t = 2\Delta z/v$, and $Z^{1/2}\_$ is a time delay $\Delta z/v$.

In frequency notation, $Z = e^{-2j\pi f \Delta t}$ where $\underline{f}$ is frequency.

When 2-D and 3-D propagation effects are taken into account, we have the following in the ($\omega$, k) domain, with $$Z = e^{-2j\Delta z \frac{\omega}{v} \sqrt{1 - v^2 k^2/\omega^2}} \quad (4)$$

By defining the propagated source S as follows:

$$S = Z^{1/2}\_S0 \quad (5)$$

the expression for D becomes:

$$D = S - ZU \quad (6)$$

putting (6) into (1) and (2), gives the following modelling equations:

$$H = S + (1 - Z)U \quad (7)$$

$$G = -S + (1 + Z)U \quad (8)$$

Consequently, S can be written:

$$S = \frac{1 + Z}{2} H - \frac{1 - Z}{2} G \quad (9)$$

An example of calibration processing of the invention is described below with reference to FIG. 2 and FIGS. 3a to 3h.

It will be observed that in a preferred implementation, the hydrophones and the geophones are not calibrated absolutely, but each geophone is calibrated relative to the hydrophone with which it is associated. The hydrophone is thus left unchanged and geophone calibration with spectral variation is sought so as to take into account the effects of coupling between the geophone and the water bottom. The hydrophone is left unchanged since it is a good reference: its coupling with its medium is always excellent and it is insensitive to its orientation.

Calibration is performed as follows.

FIGS. 3a and 3b show respectively the hydrophone recording H and the geophone recording G. To make the invention more understandable, the recording H is marked to show the primary reflection PR that contains the useful signal and also the ghost and multiple peg-leg type reflections RMF.

The hydrophone and geophone data $H_R$ and $G_R$ (FIGS. 3c, 3d) propagated over a go-and-return path in the layer of water are calculated as follows:

$$H_R = ZH \tag{10}$$

$$G_R = ZG \tag{11}$$

When using a one-dimensional approximation, equations (10) and (11) are written as follows:

$$H_R(t) = H\left(t - \frac{2\Delta z}{v}\right) \tag{12}$$

$$G_R(t) = G\left(t - \frac{2\Delta z}{v}\right) \tag{13}$$

Thereafter, the following magnitudes are calculated: hydrophone sum $H_\Sigma$ (FIG. 3e) and geophone difference $G_\Delta$ (FIG. 3f):

$$H_\Sigma = \frac{H + H_R}{2} \tag{14}$$

$$G_\Delta = \frac{G - G_R}{2} \tag{15}$$

which makes it possible to write equation (9) giving the propagated source S, in the following form:

$$S = H_\Sigma - G_\Delta \tag{16}$$

The true propagated seismic source $S_{true}$ is zero after a certain amount of time. For each source position and receiver position, it is possible to calculate the start time $T_s$ of the seismic source:

$$T_s = (\Delta z^2 + h^2)^{1/2}/v,$$

and its extinction time $T_E = T_s + \Delta T_s$, where $\Delta T_s$ is the duration of the source. $S_{true}$ must be zero beyond the extinction time $T_E$.

Also, the propagation operator Z which corresponds to go-and-return propagation through the layer of water is merely an approximate operator. In the equation $Z = e^{-2j\pi f 2\Delta z/v}$, a 1-D approximation is being made which consists in assuming that waves propagate in a direction that is close to the vertical.

This approximation is valid only in a certain zone of data. This valid zone can be defined for each trace by a validity time $T_{1D}$ beyond which the 1-D approximation is acceptable. The validity time $T_{1D}$ needs to be greater with increasing horizontal distance h of the trace.

Thus, beyond the extinction time $T_E$ and in the zone where the source operator Z is valid, the source S as calculated by (9) must be zero. Naturally, this is true only if the data from the hydrophone and the geophone is well calibrated.

This assumption is used for calibrating the geophone against the hydrophone.

More particularly, the geophone is calibrated against the hydrophone by calculating a transfer function which, when applied to the geophone, minimizes the estimated source energy in a time window situated simultaneously beyond the source extinction time and the validity time of the propagation operator.

This function C(t) is such that:

$$S(t) = H_\Sigma(t) - C(t) * G_\Delta(t) \tag{17}$$

has a minimum normalized value in the time window $t \in [T, T_{max}]$, where T is a time greater than or equal to $T_E$ and to $T_{1D}$, and where $T_{max}$ is a time shorter than the recording time for one shot.

For example, with the normalized value L2, this gives the least squares system GC=H:

$$\begin{bmatrix} G_\Delta(n_1 - p_1) & G_\Delta(n_1 - p_1 - 1) & \ldots & G_\Delta(n_1 - p_2) \\ G_\Delta(n_1 - p_1 + 1) & G_\Delta(n_1 - p_1) & \ldots & G_\Delta(n_1 - p_2 + 1) \\ \ldots & \ldots & \ldots & \ldots \\ G_\Delta(n_2 - p_1) & G_\Delta(n_2 - p_1 - 1) & \ldots & G_\Delta(n_2 - p_2) \end{bmatrix} \begin{bmatrix} C(p_1) \\ C(p_1 + 1) \\ \ldots \\ C(p_2) \end{bmatrix} = \begin{bmatrix} H_\Sigma(n_1) \\ H_\Sigma(n_1 + 1) \\ \ldots \\ \ldots \\ H_\Sigma(n_2) \end{bmatrix} \tag{18}$$

$[p_1, p_2]$ being indices corresponding to the interval $[-t_1, t_2]$, and $[n_1, n_2]$ being indices corresponding to $[T, T_{max}]$ which is solved by:

$$C = (G^T G)^{-1} G^T H \tag{19}$$

The minimized energy is $E = H^T (H - GC)$.

It depends on several parameters, in particular the depth of the water $\Delta z$ where the hydrophone and geophone sensors in question are located, and said depth can be estimated by calculating the residual energy $E(\Delta z)$ for several values of $\Delta z$ and selecting the value that minimizes said residual energy.

It also depends on the reflection coefficient r at the surface of the water, which is implicitly taken above as being equal to $-1$. This reflection is taken into account by replacing Z in equations (10) and (11) with rZ. This coefficient is calculated by selecting the coefficient which minimizes residual energy E.

Of course, it would also be possible, by a similar processing, to calibrate the hydrophone recordings on the geophone recordings or to calibrate both the geophone and the hydrophone recordings by minimizing, beyond a theorical extension time, the energy of $$S = C_H * H_\Sigma - C_G * G_\Delta,$$

where $C_H$ and $C_G$ are calibration functions, this minimizing being conducted with some constraints which are to eliminate the trivial solution ($C_H = C_G = 0$).

The calibration of the geophone recordings on the hydrophone recordings is however preferred ($C_H=1$).

Once C(t) has been calculated, calibrated geophone data is calculated by convolution between the geophone data and C(t).

It is also possible to calculate a transfer function for the water surface that has been assumed above to be a perfect mirror having a reflection coefficient of $-1$. To do this, it is assumed that the water surface acts as though it had a transfer function $-r(t)$, where r(t) is a given time medium. For this purpose, equation (6) is replaced by:

$$D=S-rZU \quad (6')$$

By writing the calibrated geophone data $G'(t)=C(t)*G(t)$, new expressions can be deduced for H, G, and S, by replacing equations (7) to (9), as follows:

$$H=S+(1-rZ)U \quad (7')$$

$$G=-S+(1+rZ)U \quad (8')$$

$$S=\frac{1+rZ}{2}H-\frac{1-rZ}{2}G \quad (9')$$

Using the notation $G'_R=ZG'$, S is put into the following form:

$$S=\frac{H-G'}{2}+r\frac{H_R+G'_R}{2} \quad (20)$$

$(H-G')$ and $(H_R+G'_R)$ are thus calculated after which r(t) is calculated so as to minimize equation (20) for S in a given time window.

The calibration C(t) can be recalculated with the water surface modelled by a transfer function $-r(t)$. From (9'), equations (14) and (15) need to be replaced as follows:

$$H_\Sigma=\frac{H+rH_R}{2} \quad (14')$$

$$G_\Delta=\frac{G-rG_R}{2} \quad (15')$$

When C(t) is calculated, it is also possible to calculate the propagated source S(t) from equation (17).

The source S obtained in this way is shown in FIG. 3g. As can be seen from the figure, this signal is of minimal energy, with the primary reflections and the ghost and peg-leg reflections being eliminated therefrom after reception of the source signal.

It is also possible to truncate the source S(t) for values $t\in[T,T_{max}]$. This truncated portion is used for quality control purposes, in which it is checked that it presents the least possible energy, and above all the least possible coherent energy.

Naturally, it is desirable for the calibration transfer function to be unique and to depend only on the characteristics of the hydrophone and of the geophone. To this end, use is made of collections of data from a common receiver, i.e. the seismic traces corresponding to different positions of the seismic source for each pair of sensors 2 and 3 are combined, and a single calibration function is calculated for the entire collection.

To this end, for each seismic trace of index $i$, where $i$ is the position index of the seismic source, the horizontal distance of the trace h(i) and the depth of the water at the position of receiver $\Delta z$ are used to calculate the extinction time of the source $T_E(i)$ and the validity time $T_{1D}(i)$ of the 1-D approximation which consists in replacing the propagation operator Z by a time delay $\Delta t=2\Delta z/v$.

Thereafter, the estimated source energy is minimized for all indices $i$ and for times greater than $T_E(i)$ and $T_{1D}(i)$. This amounts to calculating the various matrices $G_i$ and the various second members $H_i$ of equation (18) for times $T_i \geq MAX[T_E(i), T_{1D}(i)]$ and in inverting the system:

$$\left(\sum_i G_i\right)C=\sum_i H_i \quad (21)$$

obtained by summing the matrices and by summing the second members to have a single calibration function C for each receiver collection.

Once the calibration function C(t) has been calculated, calibrated geophone data is calculated by convoluting all of the geophone traces of the common receiver collection with C(t).

In the seismic prospecting method proposed by the invention, this data is then processed to deduce therefrom information about the geology of the subsoil.

One example of such processing is given below.

Naturally, other kinds of processing could also be envisaged.

After calculating the calibrated geophone data $G'=C*G$ (shown in FIG. 3h);

$G'_R=C*G_R$; and $G'_\Delta*C*G_\Delta$;

the hydrophone difference and geophone sum channels are calculated as follows:

$$H_\Delta=\frac{H-H_R}{2} \quad (22)$$

$$G'_\Sigma=\frac{G'+G'_R}{2} \quad (23)$$

Thereafter, the source and the truncated source are calculated by:

$$S=H_\Sigma-G'_\Delta \quad (24)$$

The propagated source S is then truncated into a source $S_T$ where:

$$S_T=\text{truncated }S \quad (25)$$

Thereafter the matched filtering is calculated:

$$M=H_\Delta-G'_\Sigma \quad (26)$$

and the delayed up wave:

$$U_R=\frac{S_T-M}{2} \quad (27)$$

Finally, the output is calculated:

$$U=Z^{-1}U_R \quad (28)$$

In the one-dimensional approximation, $Z^{-1}$ is an operator corresponding to a time advance of $2\Delta z/v$, i.e. (28) can be written as follows:

$$U(t)=U_R(t+2\Delta z/v) \quad (29)$$

The output U no longer has the receiver ghost and it presents attenuated noise because it is calculated from $S_T$ which has low noise since it is truncated, and from M which also has low noise since it corresponds to a matched filter.

D can also be deduced by replacing U in equation (5) by the expression therefor (28):

$$D = \frac{S_T + M}{2} \quad (30)$$

In conventional manner for the person skilled in the art, the peg-leg type secondary oscillations that appear in the same manner in the hydrophone and geophone data can be eliminated by subsequent processing.

I claim:

1. A processing method for calibrating at least one pair of hydrophone-geophone sensors disposed on a water bottom and used in seismic prospecting processing in which a sound source emits a signal into the water and the sensors at the water bottom pick up hydrophone and geophone recordings H and G, wherein calibration is applied to the recordings to minimize, in a time window beyond a theoretical extinction time, the energy of a signal S which is determined as a function of the hydrophone and geophone recordings and which corresponds to the source signal propagated through the layer of water to the sensor.

2. A method according to claim 1, wherein the hydrophone recordings H are filtered by an operator that adds a geophone type ghost reflection thereto, and then the geophone recordings G are filtered by an operator that adds a hydrophone type reflection thereto, and wherein a calibration is sought to provide, in a time window beyond the theoretical extinction time, best equalization of the hydrophone recordings and of the geophone recordings as filtered in this way.

3. A method according to claim 1, wherein the geophone recordings are calibrated against the hydrophone recordings.

4. A method for calibrating at least one pair of hydrophone-geophone sensors disposed on a water bottom and used in seismic prospecting processing in which a sound source emits a signal into the water and the sensors at the water bottom pick up hydrophone recordings H and geophone recordings G comprising the steps of:

recording data H from the hydrophone;

recording data G from the geophone;

deriving hydrophone data $H_R$ and geophone data $G_R$ corresponding to the recordings H and G as propagated over a go-and-return path through the layer of water between the sound source and the sensors;

calculating hydrophone sum data $H_\Sigma$ and geophone difference data $G_\Delta$ according to the equations:

$$H_\Sigma = \frac{H + rH_R}{2}$$

$$G_\Delta = \frac{G - rG_R}{2}$$

and $$G_\Delta = \frac{G - rG_R}{2}$$

where r is a transfer function modeling the surface of the water, determining calibration functions $C_H$ and $C_G$ to minimize, beyond a theoretical extinction time, the energy of S according to the equation:

$$S = C_H * H_\Sigma - C_G * G_\Delta$$

where S corresponds to the source signal propagated through the layer of water between the sound source and the water bottom; and calibrating the hydrophone geophone data by convolution with the calibration functions $C_H$ and $C_G$.

5. The method of claim 4 wherein $C_H$ is chosen equal to 1.

6. The method of claim 4, wherein r is chosen equal to 1.

7. The method of claim 1, wherein physical parameters are determined by minimizing the energy of the signal S in a time window beyond the theoretical extinction time.

8. The method of claim 6, wherein the depth $\Delta z$ of the layer of water is determined by calculating, for a plurality of values $\Delta z$, the energy of the signal S in a time window beyond its theoretical extinction time, and by selecting the value of Dz that minimizes said energy.

9. The method of claim 4, wherein the transfer function r of the water surface is selected to minimize the energy of the signal S in a time window beyond its theoretical extinction time.

10. The method of claim 1, including quality control in which it is verified that the propagated source signal S determined as a function of the calibrated hydrophone and geophone recordings contains minimal energy in a time window beyond its theoretical extinction time.

11. The method of claim 4, wherein the step of deriving $H_R$ and $G_R$ includes applying an operator Z to the hydrophone recordings H and to the geophone recordings G which operator Z corresponds to propagation along a go-and-return path in the layer of water, and wherein the step of determining the calibration function C includes minimizing the energy S both beyond its theoretical extinction time and in the domain in which the approximation to which the operator Z corresponds is valid.

12. The method of claim 1, wherein, for a collection of seismic traces sharing a common receiver, a calibration function is determined for the hydrophone-geophone pair of sensors that minimizes the energy of the signal S over all of the seismic traces.

13. A method of offshore seismic prospecting by means of at least one pair of hydrophone-geophone sensors disposed on a water bottom, in which a sound source emits a signal into the water and the sensors at the water bottom pick up hydrophone recordings H and geophone recordings G, wherein calibration is applied to the recordings to minimize, in a time window beyond a theoretical extension time, the energy of a signal S which is determined as a function of the hydrophone and geophone recordings and which corresponds to the source signal propagated through the layer of water to the sensor and wherein the data obtained thereby is processed to deduce information about the geology of the subsoil.

14. The method of claim 7 wherein the transfer function r of the water surface is selected to minimize the energy of the signal S in a time window beyond its theoretical extinction time.

15. The method of claim 4 further comprising the step of verifying that the propagated source signal S determined as a function of the calibrated hydrophone and geophone recordings contains minimal energy in a time window beyond its theoretical extinction time.

16. The method of claim 4 further comprising the step of collecting a plurality of seismic traces from a common pair of hydrophone-geophone sensors and wherein the calibration function determining step includes minimizing the energy of the signal S over the plurality of traces.

17. In a method of seismically exploring a geological formation beneath a body of water using at least one pair of hydrophone-geophone sensors disposed adjacent the water bottom for receiving a signal emitted from a sound source adjacent the surface of the body of water and producing hydrophone recordings and geophone recordings, a method for calibrating the pair of hydrophone-geophone sensors comprising the steps of:

recording seismic traces from each of the hydrophone and geophone sensors in the sensor pair for several different positions of the sound source;

deriving a calibration function for the pair of sensors premised on minimal source energy of the emitted signal in a time window beyond theoretical extinction time;

convolving the calibration function with the recorded traces to produce seismic data; and processing the produced data to produce a display for deducing therefrom information about the geology of the subsoil beneath the water bottom.

18. The calibration method of claim 17 wherein the deriving step includes filtering the traces from the geophone sensor using an operator that adds a ghost reflection to the geophone traces and filtering the hydrophone traces using an operator that adds hydrophone type reflection to the hydrophone traces, each operator selected to equalize the hydrophone and geophone recordings in a time window beyond the theoretical extinction time of the source energy.

* * * * *